T. MAHONEY.
SPRING CONNECTOR.
APPLICATION FILED AUG. 31, 1916.
1,225,148.
Patented May 8, 1917.
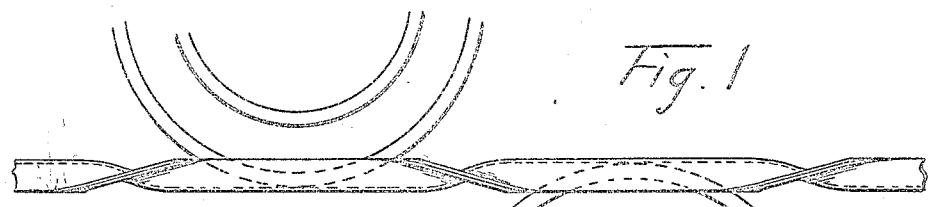
Fig. 1
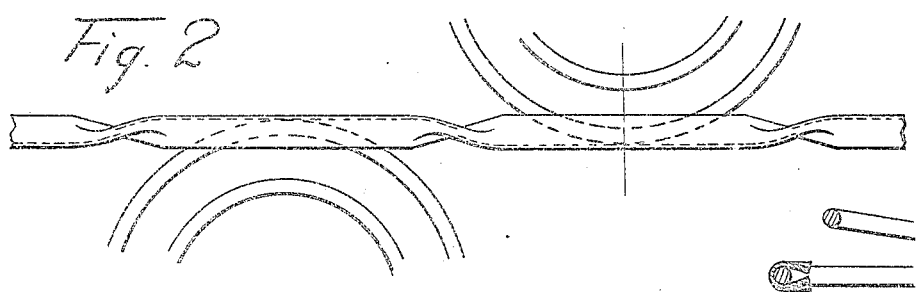
Fig. 2
Fig. 3
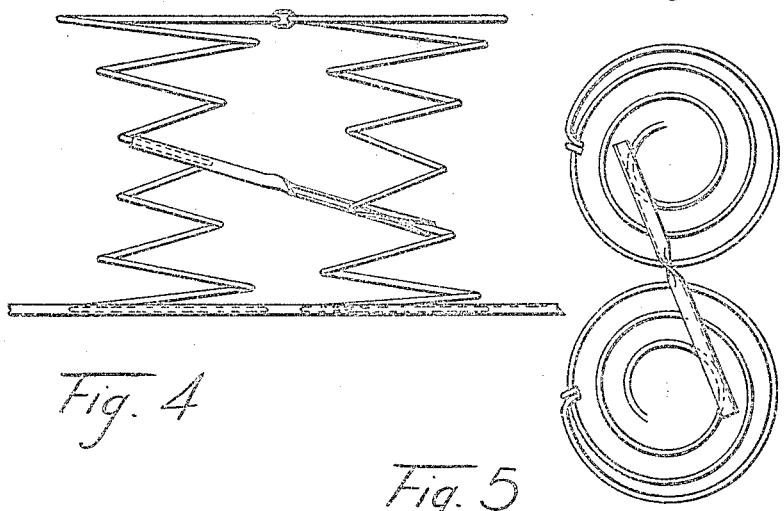
Fig. 4
Fig. 5
INVENTOR
Thomas Mahoney
BY Raymond A. Parker
ATTORNEY

UNITED STATES PATENT OFFICE.

THOMAS MAHONEY, OF DETROIT, MICHIGAN, ASSIGNOR TO LEONARD A. YOUNG, OF DETROIT, MICHIGAN.

SPRING-CONNECTOR.

1,225,148. Specification of Letters Patent. Patented May 8, 1917.

Application filed August 31, 1916. Serial No. 117,951.

*To all whom it may concern:*

Be it known that I, THOMAS MAHONEY, who am a citizen of the United States, residing at Detroit, county of Wayne, State of Michigan, have invented a certain new and useful Improvement in Spring-Connectors, and declare the following to be a full, clear, and exact description of the same, such as will enable others skilled in the art to which it pertains to make and use the same, reference being had to the accompanying drawings, which form a part of this specification.

It is the object of this invention to provide a strip for securing together the coiled springs of a spring construction. More specifically, it is the function of the strip to be able to fasten itself at successive points to coil springs at opposite sides of the strip.

A strip having this capacity and designed to secure coiled springs of staggered relation to each other is shown in Patent No. 1,014,736 issued to L. A. Young. It is the object of the present invention to afford a strip having the function of the S-strip shown in said prior patent and yet result in a material saving of stock.

In the drawings—

Figure 1, is a plan view of the strip with the adjacent spring portions.

Fig. 2, is a reverse plan view of the strip with the adjacent spring portions.

Fig. 3, is a cross-section of the strip.

Fig. 4, is a side view showing the strip used as a diagonal connector from one coiled spring to the other intermediate the top and bottom of the springs.

Fig. 5, is a plan view of the strip in this same connection.

The strip employed is a simple, cheap and efficient channel strip of the type shown in Vancise Patent No. 804,352. This Vancise strip, however, cannot successfully be used with springs which are arranged in staggered relation, as shown in Figs. 1, 2 and 3 of Patent No. 1,014,736 issued to L. A. Young. To provide a strip which will hold springs in staggered relation as already explained, there has heretofore been devised an S-strip. I have now discovered that the single channel strip can be made to accomplish this same function by twisting it so as to make first one section face one direction and the succeeding section face in the opposite direction and the third section face in the direction of the first section. There is also a very material saving in stock, as, for instance, about one-third or more is saved and when springs are made on a large scale this means a very material saving in cost.

In Figs. 4 and 5 are shown twisted strips used as a diagonal intermediate connector. The strip is diagonal in side view and plan view. With the single channel strip heretofore in use the strip could be used as a diagonal only in side view as it must connect with the same side of the two springs of a row.

What I claim is:

1. A spring connector comprising a single channel strip twisted in sections so as to present the channel alternately on opposite sides of the strip.

2. The combination with two or more springs, of a connector in the form of a channel strip twisted in section so as to present the channel alternately on opposite sides of the strip and thereby grip oppositely facing coil portions of adjacent springs.

In testimony whereof, I sign this specification.

THOMAS MAHONEY.